United States Patent Office 2,717,789
Patented Sept. 13, 1955

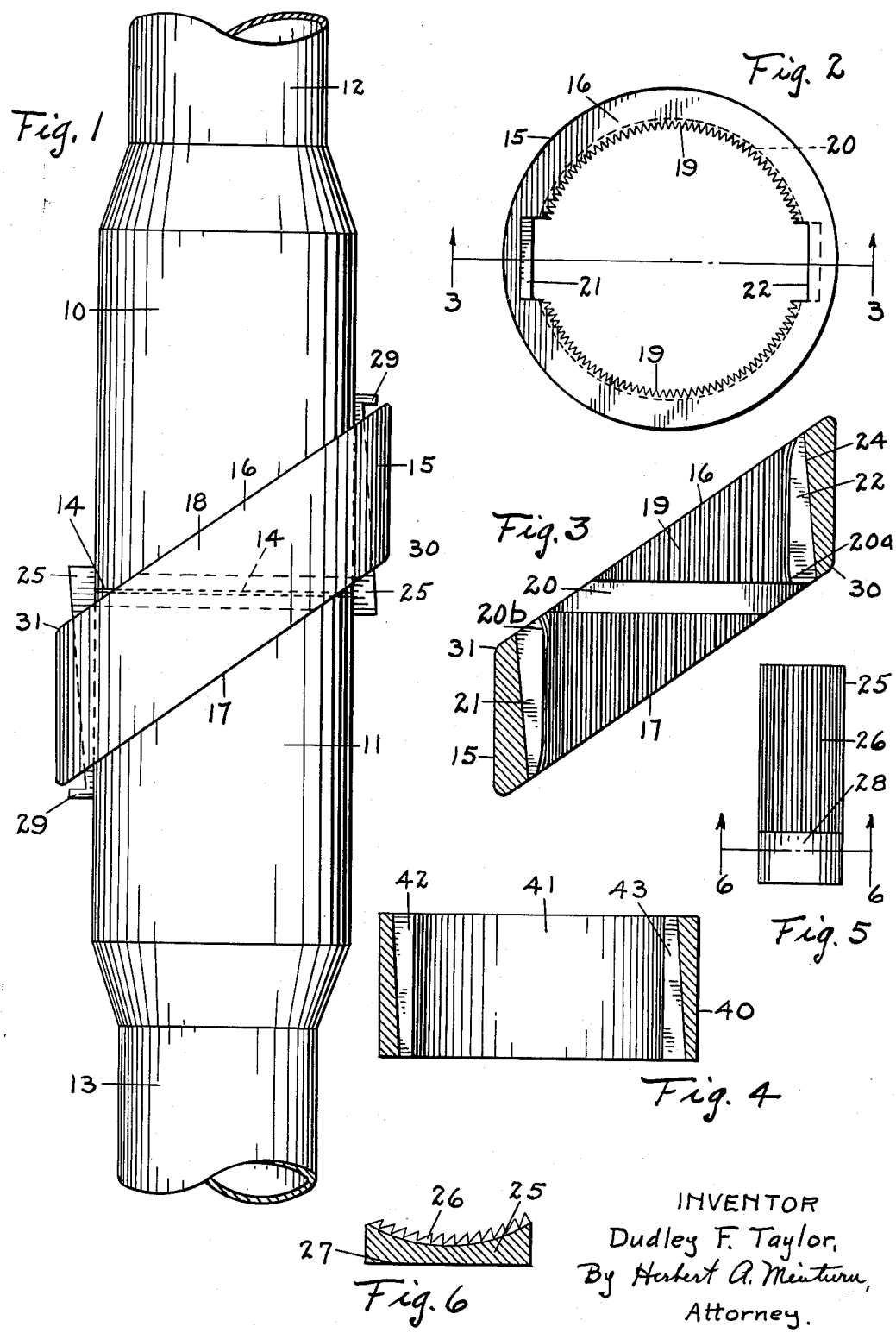

2,717,789

DRILL PIPE JOINT SECURING DEVICE

Dudley F. Taylor, Indianapolis, Ind.

Application December 28, 1950, Serial No. 203,077

1 Claim. (Cl. 285—146)

This invention relates to means for securing against loosening a drill pipe or tool joint. In using long strings of drill pipe such as in oil wells, a number of links of drill pipe have to be coupled together, and in the rotation of the pipe, there is always the danger of one of the joints coming loose, and allowing part of the string or the tool itself to drop down in the well which results in the necessity of having to fish out that lower member from the well.

The invention contemplates making no change in the joint structure itself, and the result sought is accomplished by adding a collar around the two adjacent lengths of drill pipe at its joint or around the juncture of the tool with a length of drill pipe, in such manner that the collar and its accompanying wedges will interengage both the lower and the upper end portions of the drill pipe ends at their joint.

The invention is of particular importance in the situation where the drill pipe may be reversed in rotation without becoming unjointed, regardless of the direction of the threads employed in the joint.

Furthermore, as above indicated, the invention may be applied to the more or less standardized drill pipe joint without having to make any changes therein whatsoever, and also the invention may be applied without causing any undue damage or marring of the pipe elements.

These and many other objects and advantages of the invention will become apparent to those versed in the art, in the following description of the invention as illustrated in the accompanying drawing, in which Fig. 1 is a view in side elevation of a drill pipe joint with the invention applied thereto;

Fig. 2 is a view in top plan of a collar for encircling the joint;

Fig. 3 is a view in diametrical, vertical section on the line 3—3 in Fig. 2;

Fig. 4 is a diametrical vertical section through a modified form of collar;

Fig. 5 is a view in inside elevation of a wedge block; and

Fig. 6 is a view in transverse section on an enlarged scale on the line 6—6 in Fig. 5.

In the standard construction, the enlarged end portions 10 and 11 formed on the ends of the drill pipes 12 and 13 respectively are interengaged, such as by screw-threads (not shown) to abut on a diametrical plane 14.

A collar 15 is formed to have an outside cylindrical surface, but to have its top and bottom faces inclined from the outer wall in parallel alignment. In other words the collar 15 is a diagonal section through a cylindrical form. The angle of the faces 16 and 17 to the outer wall or face of the collar 15, that is the outer surface as designated by the numeral 18, is made to be such that the collar 15 may be positioned centrally in respect to the abutting plane 14 between the ends 10 and 11 whereby a lower portion of the collar 15 will extend around one side of the portion 11, and the upper part of the collar 15 will extend around the portion 10, as indicated in Fig. 1.

The inside of the collar 15 is provided with parallel, vertically aligned teeth 19 interrupted centrally by an annular slot or recess 20, Fig. 3. On diametrically opposed portions of the inside of the collar 15, there are provided the vertically disposed slots 21 and 22. The slot 21 is provided with an outer flat wall 23 which slopes from the top face 16 diagonally inwardly and downwardly to the face 17. The slot 22 is provided with an outer flat face 24 which slopes from the top face 16 diagonally downwardly and outwardly to the face 17.

Wedge blocks 25 are formed, Figs. 1 and 5, and 6, to have their side edges fit with a sliding fit within the slots 21 and 22, one wedge to each slot, to have an inner arcuate surface provided with vertically extending teeth 26, Fig. 6. The back side of each wedge 25 has a flat face 27, and preferably the teeth 26 are relieved to have a tooth clearance area 28 toward the bottom of the wedge. The upper end of the wedge 25 in each instance is preferably provided with an outturned lip 29 to serve as a safety means to prevent the wedge from dropping free of the collar 15.

In applying the collar 15 to the drill pipe joint, the collar 15 is let down over the drill pipe 12 to have it freely pass over the end portion 10 and to have the lower part of the collar 15 drop down over the upper end portion of the joint part 11. Then the collar 15 has pressure applied to the zones indicated by the numerals 30 and 31 so as to force the teeth 19 into biting engagement with the respective end portions 10 and 11. The annular recess 20 is positioned to be centrally, vertically located in respect to the plane 14 so that the teeth 19 are not carried across the margins of the end portions 10 and 11 across that plane in order to prevent mutilation of the portions 10 and 11 adjacent that plane 14. Normally after sufficient pressure has been applied to the zones 30 and 31 of the collar 15, the collar 15 is in sufficient engagement with the end portions 10 and 11 that those portions may not unscrew one from the other by reason of the engaging of the teeth 19 with those parts.

However a wedge 25 has been placed in each of the slots 21 and 22 before the collar 15 has been forced into the tooth-biting engagement with the end portions 10 and 11, and then the wedges are driven along through their respective slots 21 and 22 to cause the teeth 26 of the wedges in each instance to bite into the respective end portions 10 and 11. In so doing, the collar 15 is brought into firmer engagement with the end portions 10 and 11 by that wedging action while those teeth 19 are actually cutting into the metal of the portions 10 and 11. The driving into tight engagement of the wedges 25 within their respective slots causes the teeth 19 to hold the end portions 10 and 11 against movement one relative to the other, up to at least the torsional twisting stress which may be exerted on the pipes 12 and 13.

When these wedges 25 are forced into their slots 21 and 22 to practically their limit, the recess portion 28 in each slot is over the juncture of the plane 14 between the two end portions 10 and 11, so that the teeth 26 of the wedge do not overlap that plane, as between the two end portions 10 and 11. In other words the teeth of one wedge will engage fully on the end portion 10 within extending down onto the portion 11, and in the same manner on the other side.

While the collar 15 has been described to have its teeth 19 substantially vertically disposed, the internal diameter of the collar 15 adjacent the recess portion 20 is greater than it would be at the outer ends of the teeth 19. This variation is made to permit the collar 15 to be inserted over the end portions 10 and 11 with the planes 16 and 17 of those faces substantially at right angles to the axis of the joint. Then when the interengagement of the collar 15 is to be effected with the end portions 10 and 11, it is rocked back to the position as indicated in Fig. 1. The teeth 19 adjacent the margin of the recess or groove 20 are further relieved as indicated at 20a and 20b adjacent the respective upper and lower margins of that groove. This recessing is necessary in order to permit the rocking of the collar 15 on the cylindrical surface of the joint as formed between the members 10 and 11.

As indicated, the ring or collar 15 may be employed in the absence of the wedge blocks 25, where the reliance would be placed upon the engaging action of the collar teeth 19. However the wedges 25 form an insurance that a very positive grip is maintained.

A collar generally designated by the numeral 40, Fig. 4, may be employed which is simply a right section of a cylinder without any teeth on its inner face 41. The internal diameter of the collar 40 is made to be such that it will fit slidingly down over the portions 10 and 11 to be centered on the transverse plane 14, and then the wedge blocks 25, one on each side, may be inserted in the respective wedge slots 42 and 43 and driven into the collar 40 along the edge portions 10 and 11, to have the teeth 26 bite into those portions. In this case, the teeth 26 will bite across the plane 14. In this case the entire torsional strain tending to separate the two portions 10 and 11 will be carried by the opposing wedges 25. As indicated in Figs. 5 and 6, the teeth 26 are preferably formed to slope in that direction which will cause them to bite deeper as the portion 10 or 11 as may be the case tends to turn thereagainst.

The external diameter of the collar 15 in the one form or the collar 40 in the other form is made to be such that there is still ample clearance for a casing shield if it is desired to be employed, and also for passage of the drilling mud between the collar and the casing or wall of the hole.

While I have herein shown and described my invention in the best form as now known to me, it is obvious that structural variations may be employed without departing from the spirit of the invention, and I therefore do not desire to be limited to that precise form beyond the limitations which may be imposed by the following claim.

I claim:

A drill pipe joint comprising two drill members screwthreadedly engaging one another in end to end abutment in a transverse plane; a single ring collar consisting of an oblique section of a cylindrical tube of constant internal diameter, the collar having upper and lower spaced apart, parallel ends inclined from the longitudinal axis of the collar, said internal diameter being greater than the external diameter of said pipe members adjacent said plane, the length of the collar between said ends in relation to the angle of inclination of the ends being that which will permit the collar to be entered over and around said pipe members to slide therealong at said plane with the collar in a rocked position of non-axial parallelism with the axis of said pipe members, said collar being rocked centrally across said plane to have the lowermost portion of its top end below said plane and the uppermost portion of its lower end above said plane on the diametrically opposite sides with the collar axis approaching coincidence with the pipe member axis; teeth around the inside of said collar extending in parallel alignment with said collar axis and a wedge member entered between said collar and each of said pipe members wedging in opposite directions from the top side of the lowermost and the underside of the uppermost of said end portions, the wedges extending in opposite directions from said plane.

References Cited in the file of this patent

UNITED STATES PATENTS

| Number | Name | Date |
|---|---|---|
| 175,695 | Guss | Apr. 4, 1876 |
| 369,136 | Stuart | Aug. 30, 1887 |
| 378,540 | Brough | Feb. 28, 1888 |
| 384,812 | Williamson | June 19, 1888 |
| 626,227 | Gaylor | June 6, 1899 |
| 952,892 | Etter | Mar. 22, 1910 |
| 1,469,304 | Hughes | Oct. 2, 1923 |
| 1,746,797 | Schoen | Feb. 11, 1930 |
| 2,111,799 | Newpher | Mar. 22, 1938 |
| 2,486,715 | Koster | Nov. 1, 1949 |